April 21, 1925.  E. FERRABINO  1,534,934
WIRE SPOKE WHEEL
Filed July 7, 1924
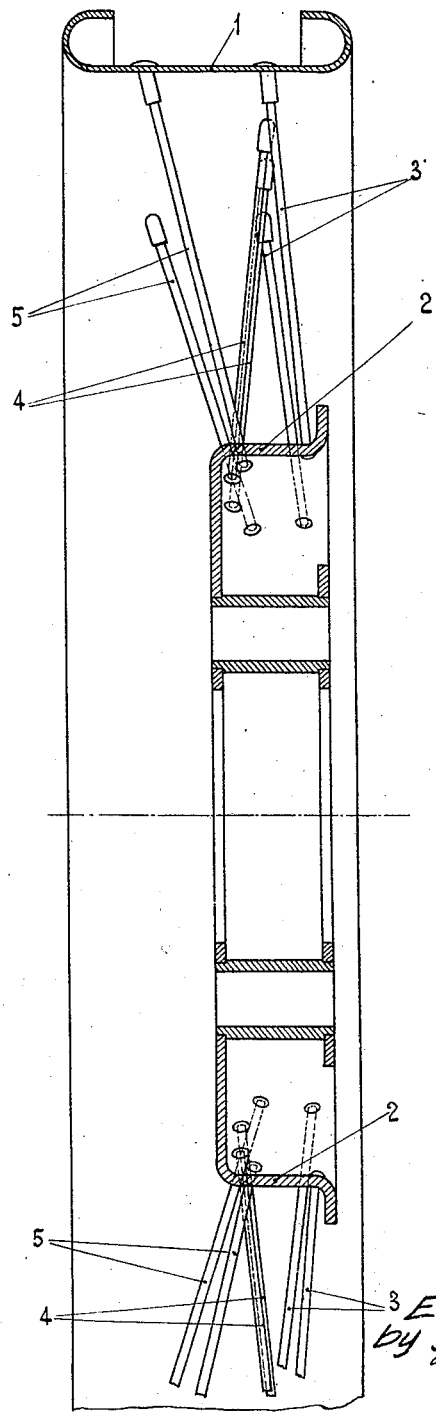
Inventor
E. Ferrabino
by Langner, Parry,
Card & Langner
Attys.

Patented Apr. 21, 1925.

1,534,934

UNITED STATES PATENT OFFICE.

EDOARDO FERRABINO, OF TURIN, ITALY.

WIRE-SPOKE WHEEL.

Application filed July 7, 1924. Serial No. 724,718.

*To all whom it may concern:*

Be it known that I, EDOARDO FERRABINO, subject of the King of Italy, residing at Turin, Italy, have invented certain new and useful Improvements in Wire-Spoke Wheels, of which the following is a specification.

The present invention relates to wire spoke wheels and has for its object a wire spoke wheel in which the wire spokes are fastened on the hub member in a portion of the same having a reduced span or width in the direction of the wheel axis as compared with the span or distance in the same direction of the points where said spokes are fastened to the rim member of the wheel.

The figure of the annexed drawing shows by way of example an embodiment of the present invention and is a fragmentary central section of the same.

Said wheel comprises a rim 1 and a hub member 2 which are interconnected by means of three rows of spokes 3, 4, 5; the spokes of the row 3 being fastened on the rim 1 near one of the edges of the same and on the hub 2 near its edge lying at the same side of the wheel as said first named edge of the rim; the spokes of the row 4 are anchored on the rim near the edge of the same where the ends of spokes 3 are fastened and on the hub 2 along its second edge that is the opposed edge with respect to the first named one, and finally the spokes 5 of the third row, which usually are in a smaller number than the spokes of each other row, are anchored on the rim 1 along its edge opposed to the first named one and on the hub along its second named edge.

The spokes of the different rows are crossing with each other by pairs, as usually, in the tangential or peripheral direction, and they may be arranged along lines tangent to circles having a more or less large diameter.

In view of the fact that the spokes are crossing each other, the anchoring points of the spokes of each row lie on lines adjacent but not coincident with each other, and therefore the portion of the cylindrical rim of the hub 2 where the spokes are fastened is nearly entirely occupied by the inner heads of the spokes.

The heads of the spokes in the hub are within a bond of lesser width than that occupied by the spoke heads in the rim. Thus the hub 2 has a lesser width than the rim, while having the desired resistance both as to the load acting on the wheel and to the stresses acting on the wheel in a transverse direction.

The described construction has the further advantage that the central longitudinal plane of the hub 2 is shifted away from the corresponding plane of the rim, thus providing for increasing the track gauge of the car wheels without necessitating cumbersome arrangements.

What I claim as my invention and desire to secure by United States Letters Patent is:—

1. A wire spoke wheel comprising a hub member, a rim member and three rows of wire spokes interconnecting said hub and rim members, the distance in the wheel axis direction between the lines where said spokes are anchored on the rim being larger than the distance in the similar direction between the lines where said spokes are anchored on the hub.

2. A wire spoke wheel comprising a rim member, a hub member having a smaller extension than said rim member in the wheel axis direction, and three rows of spokes interconnecting said hub and rim members, the distance in the wheel axis direction between the lines where said spokes are anchored on the rim being larger than the distance in the similar direction between the lines where said spokes are anchored on the hub 3. A wire spoke wheel comprising a hub member, a rim member and three rows of wire spokes interconnecting said members the spokes of one of said rows having their ends engaged with said rim along one of its edges and with said hub along its edge at the same side of said rim edge, the spokes of the second row having their ends engaged with said rim along its first named edge and with said hub along its edge opposed to the first named hub edge, and the spokes of the third row having their ends connected with said rim along its edge opposed to the first named one and with said hub along its second named edge, the distance in the wheel axis direction between the lines where said spokes are anchored on the rim being larger than the distance in the similar direction between the lines where said spokes are anchored on the hub.

4. A wire spoke wheel comprising a rim member, a hub member having a smaller extension than the said rim member in the wheel axis direction and arranged with its middle plane not coincident with the middle plane of said rim member, and three rows of spokes interconnecting said hub and rim members the distance in the wheel axis direction between the lines where said spokes are anchored on the said rim being larger than the distance in the same direction between the lines where said spokes are anchored on the hub.

In testimony whereof I have signed my name to this specification

EDOARDO FERRABINO.